United States Patent
Lai

(10) Patent No.: US 9,256,278 B2
(45) Date of Patent: Feb. 9, 2016

(54) DEVICES AND METHODS FOR MULTI-CORE MEMORY

(71) Applicant: Winbond Electronics Corp., Taichung (TW)

(72) Inventor: Chih-Jing Lai, New Taipei (TW)

(73) Assignee: Winbond Electronics Corp., Taichung (TW)

( * ) Notice: Subject to any disclaimer, the term of this patent is extended or adjusted under 35 U.S.C. 154(b) by 287 days.

(21) Appl. No.: 13/971,494

(22) Filed: Aug. 20, 2013

(65) Prior Publication Data

US 2015/0058643 A1 Feb. 26, 2015

(51) Int. Cl.
*G06F 1/32* (2006.01)
*G06F 1/26* (2006.01)

(52) U.S. Cl.
CPC ............... *G06F 1/3275* (2013.01); *G06F 1/26* (2013.01); *G06F 1/3287* (2013.01)

(58) Field of Classification Search
CPC ........ G06F 1/26; G06F 1/3275; G06F 1/3287
See application file for complete search history.

(56) References Cited

U.S. PATENT DOCUMENTS

| | | | | |
|---|---|---|---|---|
| 5,574,697 A | * | 11/1996 | Manning | 365/226 |
| 5,831,890 A | * | 11/1998 | Selna et al. | 365/51 |
| 6,707,724 B2 | | 3/2004 | Kim et al. | |
| 7,453,741 B2 | | 11/2008 | Kim et al. | |
| 2002/0105837 A1 | * | 8/2002 | Kim et al. | 365/189.09 |
| 2007/0018625 A1 | * | 1/2007 | Aikawa | 323/282 |
| 2011/0228622 A1 | * | 9/2011 | Coteus et al. | 365/226 |
| 2011/0310690 A1 | * | 12/2011 | Huang et al. | 365/226 |

* cited by examiner

*Primary Examiner* — Stefan Stoynov
(74) *Attorney, Agent, or Firm* — Muncy, Geissler, Olds & Lowe, P.C.

(57) ABSTRACT

A power management device is adopted in a memory device which includes a first memory unit and a second memory unit, including a first voltage regulator, a second voltage regulator, and a controller. The first voltage regulator receives a supply voltage from an external supply source and provides a first internal voltage to the first memory unit. The second voltage regulator receives the supply voltage from the external supply source and provides a second internal voltage to the second memory unit. The controller independently enables or disables the first voltage regulator and the second voltage regulator according to a control signal.

11 Claims, 4 Drawing Sheets

DEVICES AND METHODS FOR MULTI-CORE MEMORY

BACKGROUND OF THE INVENTION

1. Field of the Invention

The disclosure relates generally to methods and devices for power management, and more particularly, relates to methods and devices for power management of a multi-core memory.

2. Description of the Related Art

With technological development and chip architecture design evolution, processors with duo-core, quad-core, and even multi-core are becoming more common and popular nowadays. However, when the memory of a multi-core processor is shared, the processing speed depends on the transmission speed of the data bus between the processor and the memory. To break through this bottleneck, the memory is designed as a multi-core memory, such that each core of the multi-core processor corresponds with an independent memory to maintain performance. However, for multi-core memories, power management is a challenge.

BRIEF SUMMARY OF THE INVENTION

For solving the above problems, the invention provides a power management device, adopted in a memory device comprising a first memory unit and a second memory unit, comprising: a first voltage regulator, receiving a supply voltage of an external supply source and applying a first internal voltage to the first memory unit, a second voltage regulator, receiving the supply voltage of the external supply source and applying a second internal voltage to the second memory unit, and a controller, independently enabling or disabling the first voltage regulator and the second voltage regulator according to a control signal.

In an embodiment of the power management device, the power management device further comprises an internal decoder transforming an external control instruction into the control signal. In another embodiment of the power management device, the control signal is determined according to an external signal line.

In an embodiment of the power management device, the controller enables the first voltage regulator and enables the second voltage regulator in a first state, the controller disables the first voltage regulator and enables the second voltage regulator in a second state, the controller enables the first voltage regulator and disables the second voltage regulator in a third state, and the controller disables the first voltage regulator and disables the second voltage regulator in a fourth state.

In an embodiment of the power management device, the power management device further comprises a third voltage regulator, which receives the supply voltage of the external supply source, provides a reference voltage to the first voltage regulator and the second voltage regulator, and is enabled or disabled by the controller, in which, in the first state, the controller enables the third voltage regulator, in the second state, the controller enables the third voltage regulator, in the third state, the controller enables the third voltage regulator, and in the fourth state, the controller disables the third voltage regulator.

The invention further provides a power management method, adopted in a memory device, in which the memory device comprises a first memory unit and a second memory unit, the steps comprising: receiving a supply voltage of an external supply source and providing a first internal voltage to the first memory unit; receiving the supply voltage of the external supply source and providing a second internal voltage to the second memory unit; and independently enabling or disabling the first voltage regulator and the second voltage regulator according to a control signal.

In an embodiment of the power management method, the steps further comprise transforming an external control instruction into the control signal. In another embodiment of the power management method, the control signal is determined according to an external signal line.

In an embodiment of the power management method, the power management method further comprises enabling the first voltage regulator and enables the second voltage regulator in a first state, disabling the first voltage regulator and enables the second voltage regulator in a second state, enabling the first voltage regulator and disables the second voltage regulator in a third state, and disabling the first voltage regulator and disables the second voltage regulator in a fourth state.

In an embodiment of the power management method, the steps further comprise enabling and disabling a third voltage regulator, wherein the third voltage regulator receives the supply voltage of the external supply source and outputs a reference voltage, in which the third voltage regulator is enabled in the first state, the third voltage regulator is enabled in the second state, the third voltage regulator is enabled in the third state, and the third voltage regulator is disabled in the fourth state.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
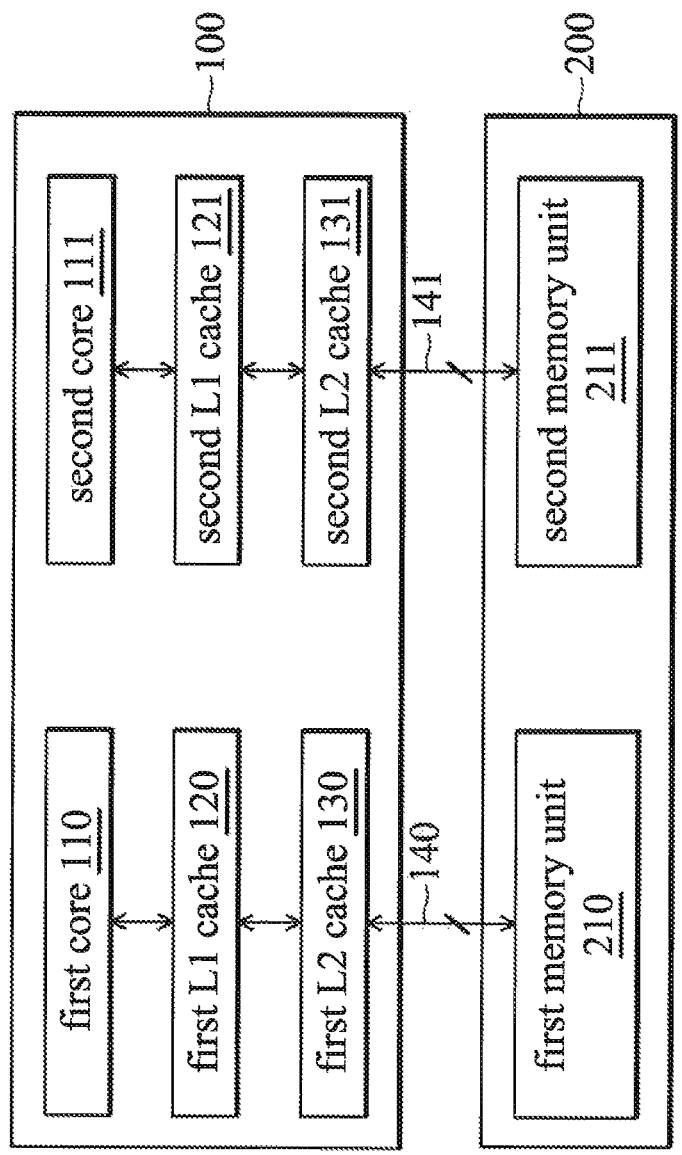
FIG. 1 is a system block diagram of a multi-core processor and a multi-core memory according to an embodiment of the invention.

FIG. 1 is a system block diagram of a multi-core processor and a multi-core memory according to an embodiment of the invention. As shown in FIG. 1, the processor 100 includes the first core 110 and the second core 111, and the first L1 cache 120 is coupled to the first core 110 and the first L2 cache 130, in which the first L1 cache 120 and the first L2 cache 130 are for exclusive use of the first core 110. The second L1 cache 121 is coupled to the second core 111 and the second L2 cache 131, and the second L1 cache 121 and the second L2 cache 131 are for exclusive use of the second core 111. According to an embodiment of the invention, the processor 100 is fabricated on a single chip.

The memory 200 includes two independent memory units which are respectively the first memory unit 210 and the second memory unit 211, in which the first core 110 communicates with the first memory unit 210 by the first data bus 140, and the second core 111 communicates with the second memory unit 211 by the second data bus 141 as well. According to an embodiment of the invention, the memory 200, like the processor 100, is fabricated on a single chip, such that it is much more convenient and easier for the first memory unit 210 and the second memory unit 211 to communicate thereamong. Compared to the first memory unit 210 and the second memory unit 211 being fabricated in different chips, there are lots of control signals between the first memory unit 210 and the second memory unit 211, which is troublesome and produces additional cost of fabrication. In addition, being fabricated in different chips results in greater area and space requirements of the whole system, which hinders miniaturization of systems. Thus, the processor 100 and the memory 200 can be fabricated in a single chip for saving cost.

Figure 2:
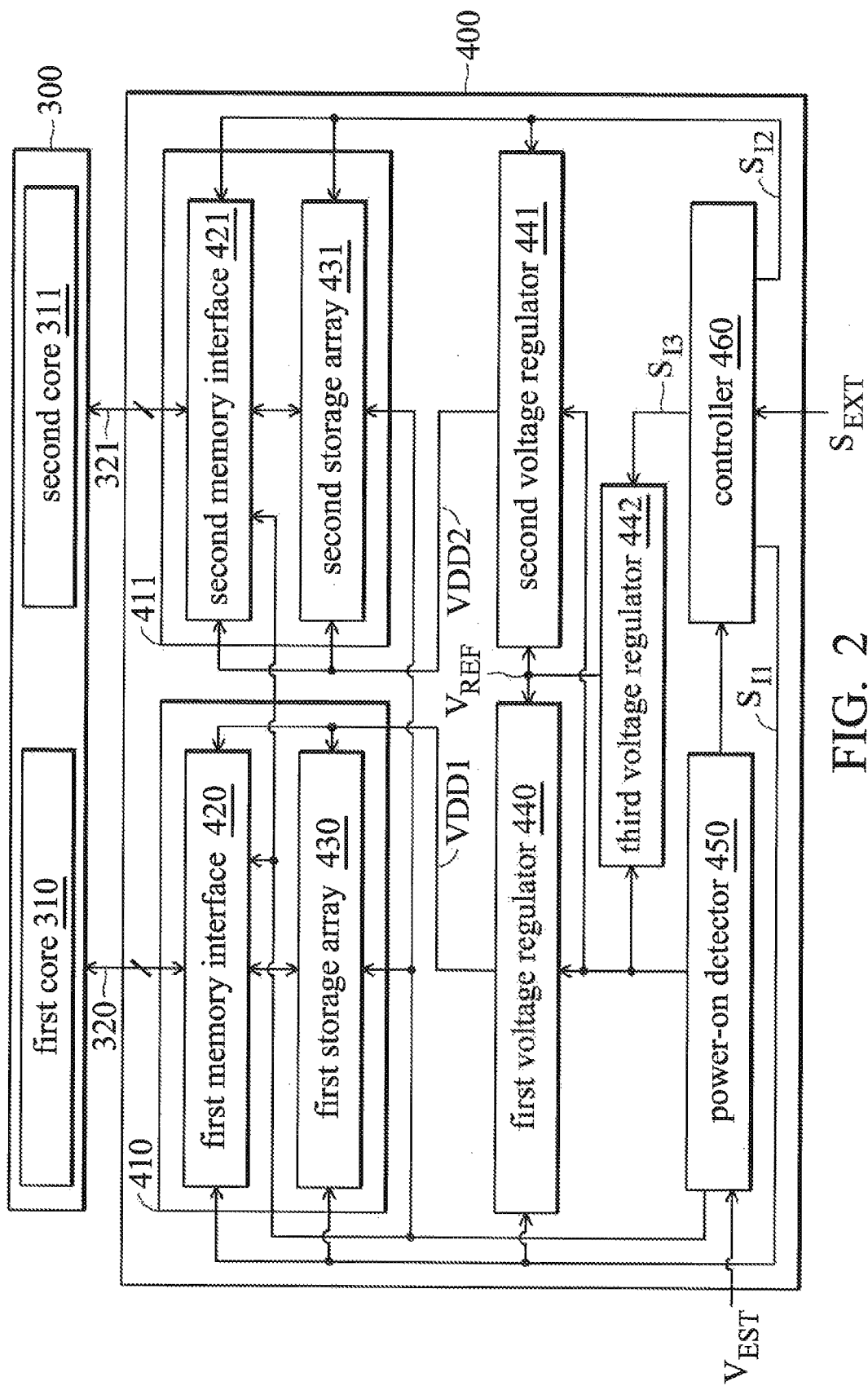
FIG. 2 is a block diagram of power management of a memory according to an embodiment of the invention.

FIG. 2 is a block diagram of power management of a memory according to an embodiment of the invention. As shown in FIG. 2, the memory 400 includes the first memory unit 410 and the second memory unit 411, in which the first memory unit 410 includes the second memory interface 421 and the second storage array 431. The first core 310 of the processor 300 is coupled to the first memory interface 420 to communicate with the first memory unit 410 of the memory 400 by the first data bus 320 and to further access the first storage array 430, and the second core 311 of the processor 300 is coupled to the second memory interface 421 to communicate with the second memory unit 411 of the memory 400 by the second data bus 321 and to further access the second storage array 431. In FIG. 2, the processor 300 and the memory 400 respectively correspond to the processor 100 and the memory 200 of FIG. 1, and the first data bus 320 and the second data bus 321 respectively correspond to be first data bus 140 and the second data bus 141 of FIG. 1.

As shown in FIG. 2, the memory 400 further includes the first voltage regulator 440, the second voltage regulator 441, and the third voltage regulator 442. When the external voltage VEST is detected by the power-on detector 450, the power-on detector 450 detects whether the external voltage VEST is greater than the minimum operation voltage or not, and transmits the external voltage VEST to drive the memory. According to an embodiment of the invention, the operation voltage of the memory 400 is 5V, and the external voltage VEST is applied to the memory 400 after the external voltage VEST rises smoothly from 0V to 5V. To make sure that the logic state of the internal circuits in the memory 400 is in normal operation, when the external voltage VEST reaches the minimum operation voltage 2V of the memory 400, the power-on detector 450 provides the result of the external voltage VEST reaching the minimum operation voltage to the internal circuits of the memory 400, such that the internal circuits can begin operation for preventing the logic state of the internal circuits in the memory 400 from being abnormal after startup.

According to an embodiment of the invention, after the power-on detector 450 detects that the external voltage VEST has reached the minimum operation voltage, the first voltage regulator 440 provides the first supply voltage VDD1 to the first memory interface 420 of the first memory unit 410 and the first storage array 430, the second voltage regulator 441 provides the second supply voltage VDD2 to the second memory interface 421 of the second memory unit 411 and the second storage array 431, and the third voltage regulator 442 generates the reference voltage VREF tor the first voltage regulator 440 and the second voltage regulator 441.

The controller 460 receives the comparison result of the external voltage VEST provided by the power-on detector 450 and the control signal SEXT to generate the first internal signal SI1, the second internal signal SI2, and the third internal signal SI3 which independently enables or disables the first voltage regulator 440, the second voltage regulator 441, and the third voltage regulator 442. According to an embodiment of the invention, the control signal SEXT can be transformed from a set of external control instructions by an internal decoder of the memory 400. According to another embodiment of the invention, the control signal SEXT is determined according to an external signal line.

According to an embodiment of the invention, the controller 460 can enable the first voltage regulator 440 and the second voltage regulator 441 at the same time, or enable one of the first voltage regulator 440 and the second voltage regulator 441, or disable the first voltage regulator 440 and the second voltage regulator 441 at the same time. Because the third voltage regulator 442 is used to provide the reference voltage VREF to the first voltage regulator 440 and the second voltage regulator 441, the third voltage regulator 442 must remain in an enable state when enabling any one of the first voltage regulator 440 and the second voltage regulator 441, and the third voltage regulator 442 must not be disabled until the first voltage regulator 440 and the second voltage regulator 441 are both disabled.

According to an embodiment of the invention, to make sure the logic states are correct after the circuits are disabled and then enabled, the first internal signal SI1 and the second internal signal SI2, output by the controller 460, are respectively provided to the first memory interface 420, the first storage array 430, the second memory interface 421, and the second storage array 431 as an reset signal.

Figure 3A:
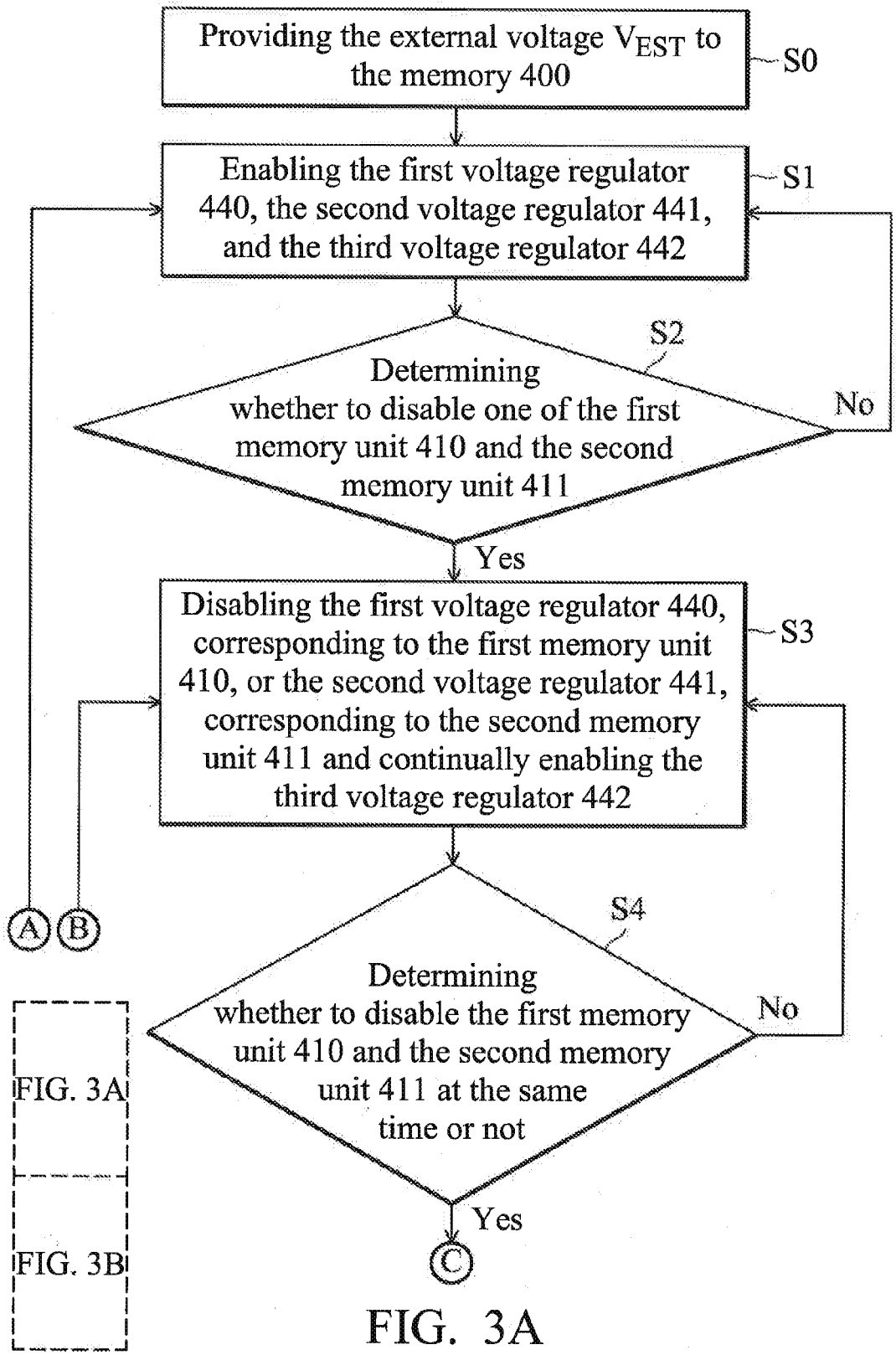
FIGS. 3A and 3B show a flow chart of a power management method according to an embodiment of the invention.
Figure 3B:
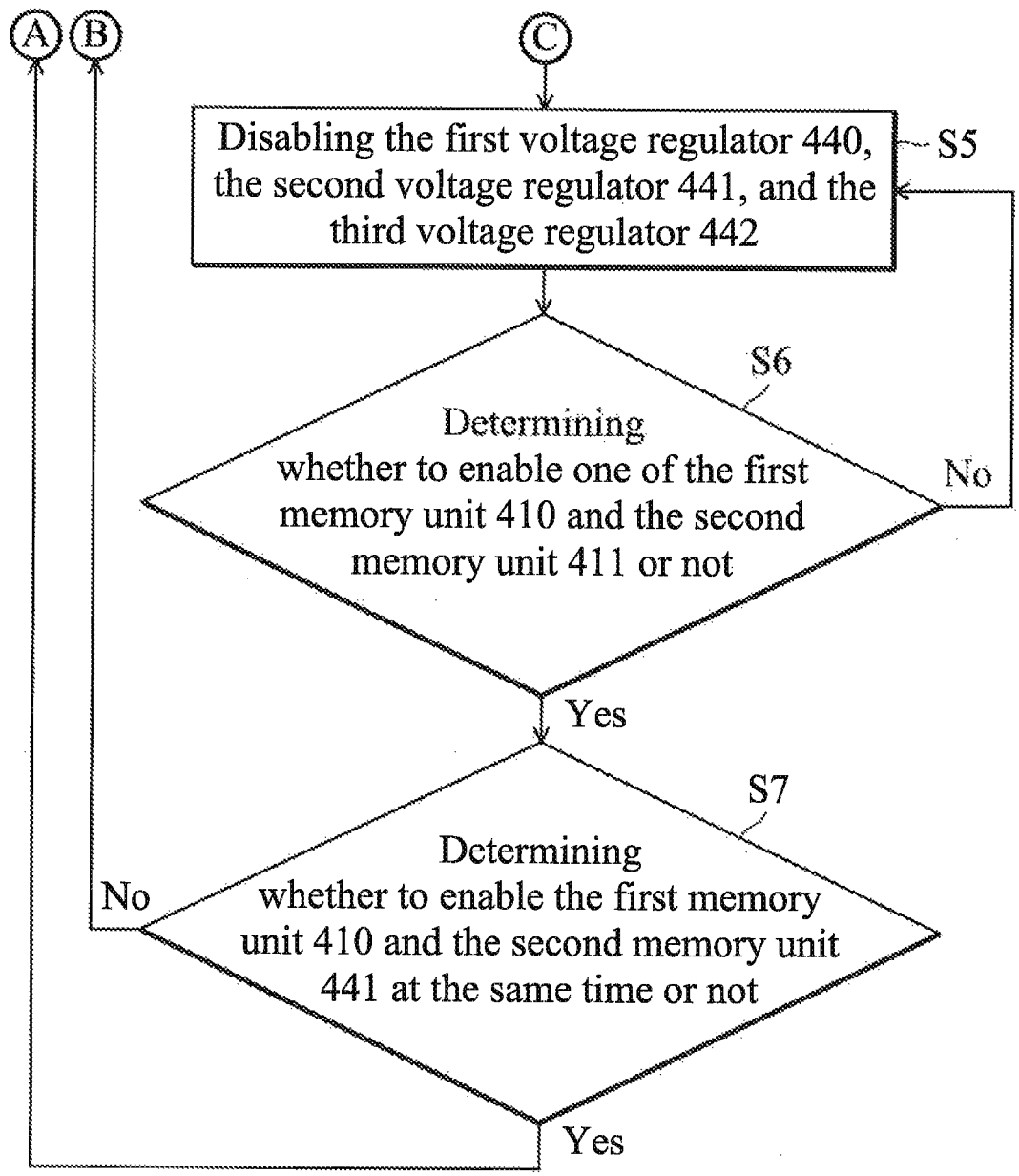

FIGS. 3A and 3B show a flow chart of a power management method according to an embodiment of the invention. FIGS. 3A and 3B herein are illustrated with FIG. 2. To begin, the external voltage VEST is provided to the memory 400 (S0). When detecting that the external voltage VEST greater than the minimum operation voltage, the first voltage regulator 440, the second voltage regulator 441, and the third voltage regulator 442 are enabled (S1). Whether one of the first memory unit 410 and the second memory unit 411 needs to be disabled is determined (S2). If yes, the first voltage regulator 440, corresponding to the first memory unit 410, or the second voltage regulator 441, corresponding to the second memory unit 411, is disabled, and the third voltage regulator 442 is continually enabled (S3). If not, the state at step S1 does not change, and then whether to disable the first memory unit 410 and the second memory unit 411 at the same time or not is determined (S4). If yes, the first voltage regulator 440, the second voltage regulator 441, and the third voltage regulator 442 are all disabled (S5). If not, the state at step S3 does not change. When the first memory unit 410 and the second memory unit 411 are both disabled, whether to enable one of the first memory unit 410 and the second memory unit 411 or not is determined (S6). If not, the state at step S5 does not change. If yes, whether to enable the first memory unit 410 and the second memory unit 411 at the same time or not is then determined (S7). If yes, step S1 is performed. If not, step S3 is performed.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A power management device, adopted in a memory device, wherein the memory device comprises a first memory unit and a second memory unit, the power management device comprising:

a first voltage regulator, receiving a supply voltage of an external supply source and applying a first internal voltage to the first memory unit;

a second voltage regulator, receiving the supply voltage of the external supply source and applying a second internal voltage to the second memory unit; and a controller, independently enabling or disabling the first voltage regulator and the second voltage regulator according to a control signal in order to independently enable or disable the corresponding first memory unit and second memory unit.

2. The power management device of claim 1, further comprising an internal decoder transforming an external control instruction into the control signal.

3. The power management device of claim 1, wherein the control signal is determined according to an external signal line.

4. The power management device of claim 1, wherein:
in a first state, the controller enables the first voltage regulator and enables the second voltage regulator;
in a second state, the controller disables the first voltage regulator and enables the second voltage regulator;
in a third state, the controller enables the first voltage regulator and disables the second voltage regulator; and
in a fourth state, the controller disables the first voltage regulator and disables the second voltage regulator.

5. The power management device of claim 4, further comprising a third voltage regulator, receiving the supply voltage of the external supply source, providing a reference voltage to the first voltage regulator and the second voltage regulator, and being enabled or disabled by the controller.

6. The power management device of claim 5, wherein:
in the first state, the controller enables the third voltage regulator;
in the second state, the controller enables the third voltage regulator;
in the third state, the controller enables the third voltage regulator; and
in the fourth state, the controller disables the third voltage regulator.

7. A power management method, adopted in a memory device, wherein the memory device comprises a first memory unit and a second memory unit, the power management method comprising:
using a first voltage regulator for receiving a supply voltage of an external supply source and providing a first internal voltage to the first memory unit;
using a second voltage regulator for receiving the supply voltage of the external supply source and providing a second internal voltage to the second memory unit; and
independently enabling or disabling the first voltage regulator and the second voltage regulator according to a control signal in order to independently enable or disable the corresponding first memory unit and second memory unit.

8. The power management method of claim 7, further comprising transforming an external control instruction into the control signal.

9. The power management method of claim 7, wherein the control signal is determined according to an external signal line.

10. The power management method of claim 7, wherein:
in a first state, the first voltage regulator is enabled and the second voltage regulator is enabled;
in a second state, the first voltage regulator is disabled and the second voltage regulator is enabled;
in a third state, the first voltage regulator is enabled and the second voltage regulator is disabled; and
in a fourth state, the first voltage regulator is disabled and the second voltage regulator is disabled.

11. The power management method of claim 10, further comprising enabling and disabling a third voltage regulator, wherein the third voltage regulator receives the supply voltage of the external supply source and outputs a reference voltage, wherein:
in the first state, the third voltage regulator is enabled;
in the second state, the third voltage regulator is enabled;
in the third state, the third voltage regulator is enabled; and
in the fourth state, the third voltage regulator is disabled.

* * * * *